(12) United States Patent
Satou

(10) Patent No.: US 10,416,390 B2
(45) Date of Patent: Sep. 17, 2019

(54) OPTICAL FIBER CABLE UNIT

(71) Applicant: FANUC CORPORATION, Yamanashi (JP)

(72) Inventor: Takanori Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/937,955

(22) Filed: Mar. 28, 2018

(65) Prior Publication Data
US 2018/0292610 A1    Oct. 11, 2018

(30) Foreign Application Priority Data
Apr. 10, 2017 (JP) .................... 2017-077795

(51) Int. Cl.
*G02B 6/35* (2006.01)
*G02B 6/32* (2006.01)
*G02B 6/38* (2006.01)

(52) U.S. Cl.
CPC .......... *G02B 6/3512* (2013.01); *G02B 6/3514* (2013.01); *G02B 6/32* (2013.01); *G02B 6/3526* (2013.01); *G02B 6/3548* (2013.01); *G02B 6/3878* (2013.01)

(58) Field of Classification Search
CPC .................... G02B 6/3512; G02B 6/3514
See application file for complete search history.

(56) References Cited

U.S. PATENT DOCUMENTS

| 5,565,119 A * | 10/1996 | Behun ............. B29C 66/43 219/121.63 |
| 7,485,828 B2 * | 2/2009 | Akaba ............ B23K 26/067 219/121.8 |
| 2016/0062036 A1 * | 3/2016 | Mori ............. G02B 6/02042 250/492.1 |

FOREIGN PATENT DOCUMENTS

| JP | S57-192914 A | 11/1982 |
| JP | S63-68621 U | 5/1988 |
| JP | H04-026810 A | 1/1992 |
| JP | H10-261999 A | 9/1998 |
| JP | 2011-227269 A | 11/2011 |
| JP | 2016-043405 A | 4/2016 |

OTHER PUBLICATIONS

An Office Action mailed by the Japanese Patent Office dated Nov. 27, 2018, which corresponds to Japanese Patent Application No. 2017-077795 and is related to U.S. Appl. No. 15/937,955.

* cited by examiner

*Primary Examiner* — Ryan A Lepisto
(74) *Attorney, Agent, or Firm* — Studebaker & Brackett PC

(57) ABSTRACT

An optical fiber cable unit has an optical fiber cable obtained by binding a plurality of optical fibers and transmits a laser beam using transmission paths having the optical fibers, respectively. The optical fiber cable unit includes: an input-side connection unit that inputs the laser beam to the optical fibers; a one-end-side connection unit fixed to one end of the optical fiber cable and connected to the input-side connection unit; an other-end-side connection unit fixed to the other end of the optical fiber cable; and an output-side connection unit to which the other-end-side connection unit is connected and in which the laser beam from the optical fibers is output. The input-side connection unit has a switching (Continued)

mechanism that switches the transmission paths for transmitting the laser beam.

10 Claims, 8 Drawing Sheets

OPTICAL FIBER CABLE UNIT

This application is based on and claims the benefit of priority from Japanese Patent Application No. 2017-077795, filed on 10 Apr. 2017, the content of which is incorporated herein by reference.

BACKGROUND OF THE INVENTION

Field of the Invention

The present invention relates to an optical fiber cable unit having an optical fiber cable obtained by binding a plurality of optical fibers.

Related Art

Conventionally, an optical fiber cable having optical fibers is wired in a laser machining apparatus and a robot, and an optical fiber transmits a laser beam to a machining head. When an optical fiber is broken, since it is necessary to replace the entire optical fiber cable, the replacement incurs a considerable amount of time.

Patent Document 1 discloses a laser machining apparatus in which an input-side optical fiber cable obtained by binding a plurality of optical fibers connected individually to a plurality of semiconductor laser devices and an output-side optical fiber cable obtained by binding a plurality of optical fibers larger in number than the plurality of optical fibers forming the input-side optical fiber cable are detachably connected by a connector and are used for laser machining.

According to this laser machining apparatus, the number of optical fibers forming the output-side optical fiber cable is larger than the number of optical fibers forming the input-side optical fiber cable. Due to this, even when some of the plurality of optical fibers forming the output-side optical fiber cable are broken, it is possible to continuously use all the plurality of semiconductor laser devices by detaching the output-side optical fiber cable and switching from the broken optical fiber to another optical fiber.

Patent Document 1: Japanese Unexamined Patent Application, Publication No. 2011-227269

SUMMARY OF THE INVENTION

However, in the laser machining apparatus disclosed in Patent Document 1, it is necessary to replace the entire input-side optical fiber cable when the input-side optical fiber cable is broken, and the replacement incurs a considerable amount of time.

An object of the present invention is to provide an optical fiber cable unit which can be used continuously without replacing an entire optical fiber cable even when some of a plurality of optical fibers are broken.

(1) An optical fiber cable unit (for example, an optical fiber cable unit 1, 1A, 1B, 1C, 1D to be described later) according to the present invention is an optical fiber cable unit which has an optical fiber cable (for example, an optical fiber cable 3 to be described later) obtained by binding a plurality of optical fibers (for example, optical fibers 12a, 12b, 12c to be described later) and which transmits a laser beam (for example, a laser beam LB to be described later) using a plurality of transmission paths (for example, transmission paths L1, L2, L3 to be described later) having the optical fibers, respectively, the optical fiber cable unit including: an input-side connection unit (for example, an input-side connection unit 5 to be described later) which is a connection unit on a side where the laser beam is input to the optical fiber; a one-end-side connection unit (for example, a one-end-side connection unit 6 to be described later) which is fixed to one end of the optical fiber cable and is connected to the input-side connection unit; an other-end-side connection unit (for example, an other-end-side connection unit 7 to be described later) fixed to the other end of the optical fiber cable; and an output-side connection unit (for example, an output-side connection unit 8 to be described later) to which the other-end-side connection unit is connected and which is a connection unit on a side where the laser beam from the optical fiber is output, wherein at least one of the input-side connection unit, the one-end-side connection unit, the other-end-side connection unit, and the output-side connection unit has a switching mechanism (for example, a switching mechanism 9, 32 to be described later) that switches the transmission path for transmitting the laser beam.

(2) In the optical fiber cable unit according to (1), the output-side connection unit may have a merging mechanism (for example, a merging mechanism 15 to be described later) that merges the plurality of transmission paths.

(3) In the optical fiber cable unit according to (1) or (2), a core of at least one of the plurality of optical fibers may have a different diameter than that of a core of the other optical fiber.

(4) In the optical fiber cable unit according to any one of (1) to (3), the one-end-side connection unit may have a plurality of one-end-side blocks (for example, quartz blocks 10a, 10b, 10c, 10d to be described later) that protrude at equal intervals in a circumferential direction to form the transmission path, the input-side connection unit may have a plurality of input-side insertion holes (for example, input-side insertion holes 18a, 18b, 18c to be described later) which are disposed at equal intervals in a circumferential direction and into which the plurality of one-end-side blocks are inserted, the input-side connection unit and the one-end-side connection unit may have a one-end-side positioning mechanism (for example, a positioning groove 19 or a positioning projection 23 to be described later) that realizes positioning of the one-end-side connection unit with respect to the input-side connection unit, and the one-end-side positioning mechanism may be switchable to a positioning disabling state in which the mechanism does not perform positioning of the one-end-side connection unit with respect to the input-side connection unit.

(5) In the optical fiber cable unit according to (4), the plurality of one-end-side blocks may be detachable individually, and the plurality of optical fibers may be detachable individually.

(6) In the optical fiber cable unit according to any one of (1) to (5), the other-end-side connection unit has a plurality of other-side blocks (for example, quartz blocks 14a, 14b, 14c to be described later) that protrude at equal intervals in a circumferential direction to form the transmission path, the output-side connection unit may have a plurality of output-side insertion holes which are disposed at equal intervals in a circumferential direction and into which the plurality of other-side blocks are inserted, the output-side connection unit and the other-end-side connection unit may have an other-end-side positioning mechanism that realizes positioning of the other-end-side connection unit with respect to the output-side connection unit, and the other-end-side positioning mechanism may be switchable to a positioning disabling state in which the mechanism does not perform positioning of the other-end-side connection unit with respect to the output-side connection unit.

(7) In the optical fiber cable unit according to (6), the plurality of other-side blocks may be detachable individually, and the plurality of optical fibers may be detachable individually.

According to the present invention, it is possible to provide an optical fiber cable unit which can be used continuously without replacing an entire optical fiber cable even when some of a plurality of optical fibers are broken.

DETAILED DESCRIPTION OF THE INVENTION

Figure 1:
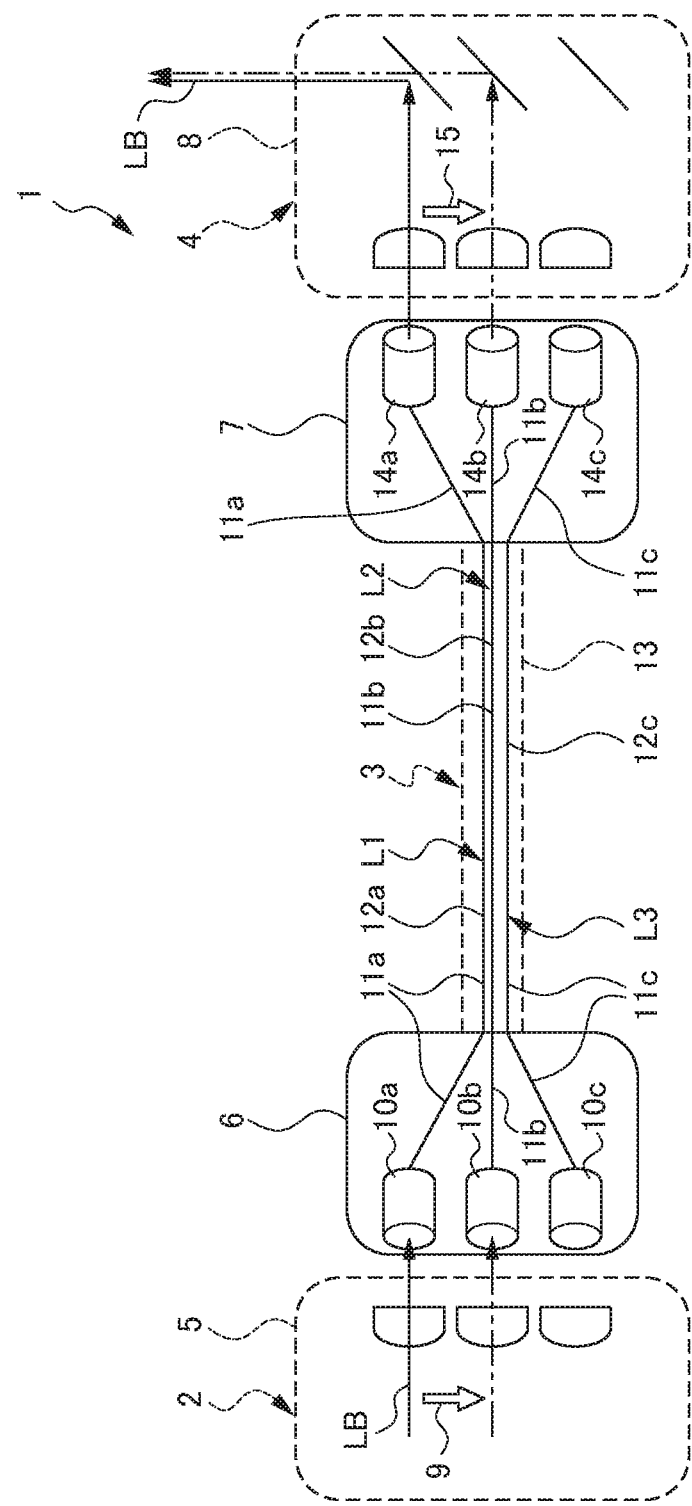
FIG. 1 is a schematic diagram of an optical fiber cable unit according to a first embodiment of the present invention.

Hereinafter, a first embodiment of the present invention will be described in detail with reference to the drawings. In description of the second and subsequent embodiments, the same constituent elements as those of the first embodiment will be denoted by the same reference numerals, and the description thereof will be omitted.

[First Embodiment]

Figure 2:
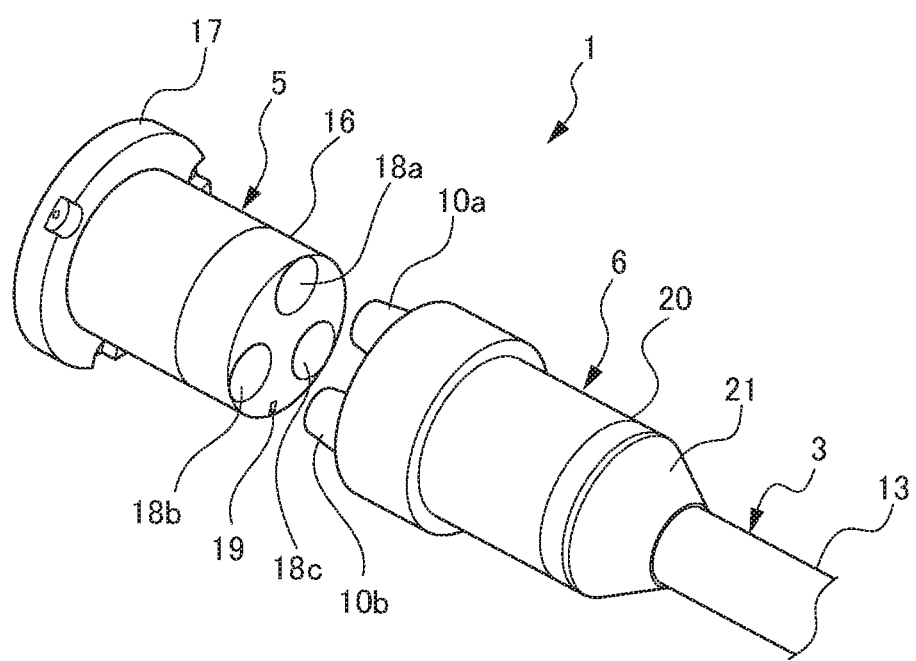
FIG. 2 is an external perspective view of an input-side connection unit included in an input device and a one-end-side connection unit fixed to one end side of an optical fiber cable.
Figure 3:
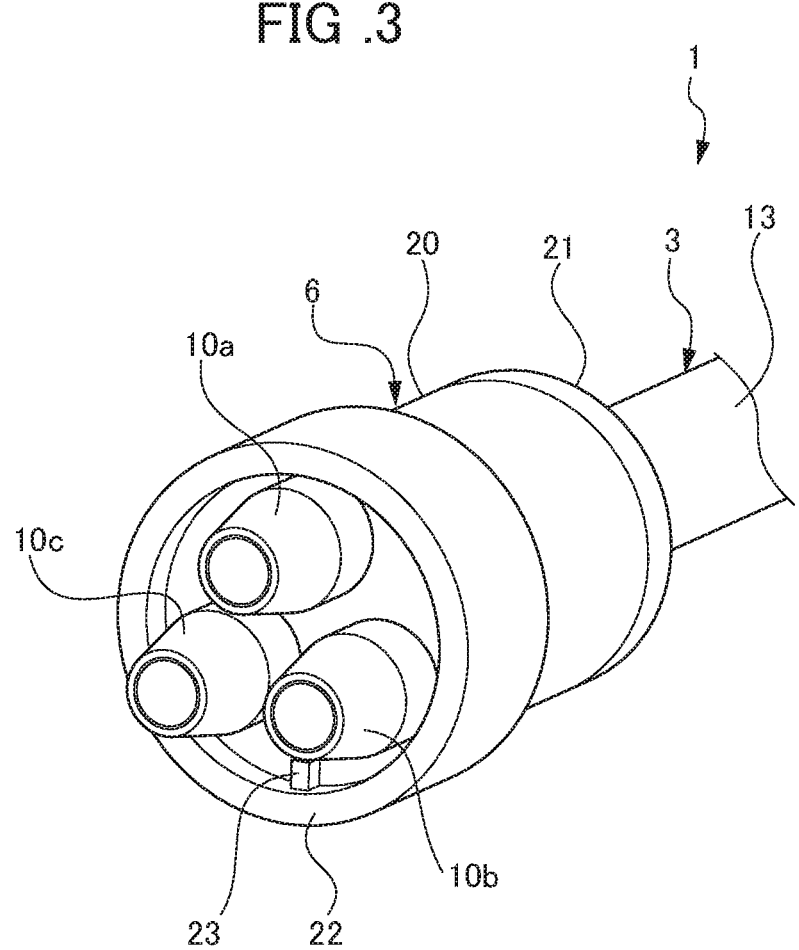
FIG. 3 is an external perspective view of a one-end-side connection unit fixed to one end side of the optical fiber cable.

FIG. 1 is a schematic diagram of an optical fiber cable unit 1 according to a first embodiment of the present invention. FIG. 2 is an external perspective view of an input-side connection unit 5 included in an input device 2 and a one-end-side connection unit 6 fixed to one end side of an optical fiber cable 3. FIG. 3 is an external perspective view of the one-end-side connection unit 6 fixed to one end side of the optical fiber cable 3.

As illustrated in FIG. 1, the optical fiber cable unit 1 of the first embodiment is configured to transmit a laser beam LB generated by the input device 2 such as a laser oscillator to an output device 4 such as a laser machining apparatus or a robot using the optical fiber cable 3 and is used by switching transmission paths L1, L2, and L3. Specifically, the optical fiber cable unit 1 includes an input-side connection unit 5, a one-end-side connection unit 6, an optical fiber cable 3, an other-end-side connection unit 7, and an output-side connection unit 8.

The input-side connection unit 5 is a connector included in the input device 2 which is a device that inputs the laser beam LB and forms a connector pair together with the one-end-side connection unit 6 that is fixed to one end of the optical fiber cable 3. The one-end-side connection unit 6 is detachably attached to the input-side connection unit 5. The input-side connection unit 5 has a switching mechanism 9 that switches the transmission paths L1 to L3 for transmitting the laser beam LB generated by the input device 2 to the output device 4. The switching mechanism 9 can be realized by various structures such as a structure that guides the laser beam generated by the input device 2 to the inlets of the transmission paths L1 to L3 by moving a mirror or a structure that guides the laser beam generated by the input device 2 to the inlets of the transmission paths L1 to L3 by moving the inlets of the transmission paths L1 to L3.

The one-end-side connection unit 6 is a connector fixed to one end of the optical fiber cable 3 and forms a connector pair together with the input-side connection unit 5 included in the input device 2. The input-side connection unit 5 is detachably connected to the one-end-side connection unit 6. The one-end-side connection unit 6 includes three quartz blocks (one-end-side blocks) 10a, 10b, and 10c that form the transmission paths L1 to L3, respectively, and three optical fiber tubes 11a, 11b, and 11c drawn from the optical fiber cable 3.

The quartz blocks 10a to 10c are welded to one set of ends of the optical fibers 12a, 12b, and 12c that form the optical fiber tubes 11a to 11c. The details of the quartz blocks 10a to 10c will be described later.

The optical fiber tubes 11a to 11c include optical fibers 12a to 12c that form the transmission paths L1 to L3, respectively, disconnection detection wires (not illustrated), and tubes (not illustrated) that accommodate one set of pairs of these wires. The disconnection detection wire forms a closed circuit together with an electrification means (not illustrated) included in the input device 2 or the output device 4. The disconnection detection wire is always electrified by the electrification means and is disconnected by melting down with the heat of a laser beam and is not electrified when the optical fibers 12a to 12c are disconnected or damaged and a laser beam leaks. The electrification means detects a state in which the disconnection detection wire is not electrified as disconnection or damage of the optical fibers 12a to 12c.

The optical fiber cable 3 is a cable obtained by binding the plurality of optical fibers 12a to 12c. Specifically, the optical fiber cable 3 includes the optical fiber tubes 11a to 11c, a cooling means (not illustrated), and a protective metallic flexible tube 13 that incorporates these elements therein. Each of the optical fibers 12a to 12c included in the optical fiber tubes 11a to 11c includes a core (not illustrated) which is a core material for transmitting a laser beam and a cladding (not illustrated) on the outer side of the core. A step or a groove for removing a laser beam propagating through the cladding is formed in the circumference of the cladding. The optical fibers 12a to 12c generate heat due to a laser beam absorbed in the ends welded to the quartz blocks 10a to 10c, 14a, 14b, and 14c and the step or groove of the cladding. The cooling means cools the optical fibers 12a to 12c with a coolant.

The other-end-side connection unit 7 is a connector fixed to the other end of the optical fiber cable 3 and forms a connector pair together with the output-side connection unit 8 included in the output device 4. The output-side connection unit 8 is detachably connected to the other-end-side connection unit 7. The other-end-side connection unit 7 includes three quartz blocks (other-side blocks) 14a to 14c that form the transmission paths L1 to L3, respectively and three optical fiber tubes 11a to 11c drawn from the optical fiber cable 3.

The quartz blocks 14a to 14c are welded to the other set of ends of the optical fibers 12a to 12c. The quartz blocks 14a to 14c are similar to the quartz blocks 10a to 10c, and the detailed description thereof will be omitted.

The output-side connection unit 8 is a connector included in the output device 4 which is a device that outputs a laser beam LB and forms a connector pair together with the other-end-side connection unit 7 fixed to the other end of the optical fiber cable 3. The other-end-side connection unit 7 is detachably connected to the output-side connection unit 8. The output-side connection unit 8 has a merging mechanism 15 that merges the plurality of transmission paths L1 to L3 into one transmission path. The merging mechanism 15 can be realized by various structures such as a fiber coupler. Since the optical fiber cable unit 1 includes the merging mechanism 15, even when the laser beam is transmitted using any one of the plurality of transmission paths L1 to L3, the optical fiber cable unit 1 guides the laser beam LB to the same machining point.

As illustrated in FIG. 2, the input-side connection unit 5 includes a connector body 16 having a cylindrical external shape and a flange 17 molded integrally to a base end of the connector body 16 and fixed by screws to the input device 2 (see FIG. 1). The input-side connection unit 5 has a plurality of input-side insertion holes 18a, 18b, and 18c which are disposed in a distal end surface of the connector body 16 at equal intervals (at equal angular intervals) of 120° in the circumferential direction and into which the quartz blocks 10a to 10c are inserted, respectively. The input-side connection unit 5 has a positioning groove 19 as a key groove formed in a rim of the distal end surface of the connector body 16 to achieve positioning of the one-end-side connection unit 6.

As illustrated in FIGS. 2 and 3, the one-end-side connection unit 6 includes a connector body 20 obtained by connecting two cylindrical bodies having different diameters and a conical connection portion 21 of which the diameter decreases from the connector body 20 toward a base end and which is connected to the metallic flexible tube 13 of the optical fiber cable 3. The one-end-side connection unit 6 has tapered quartz blocks 10a to 10c that protrude from the distal end surface of the connector body 20 at equal intervals (equal angular intervals) of 120° in the circumferential direction.

The one-end-side connection unit 6 has an annular guide frame 22 which is formed in an entire rim of the distal end surface of the connector body 20 and into which the distal end of the connector body 16 of the input-side connection unit 5 is fitted. The one-end-side connection unit 6 has a positioning projection 23 as a key which is formed in the inner side of the guide frame 22 so as to be fitted into the positioning groove 19 of the input-side connection unit 5 to realize positioning with respect to the input-side connection unit 5. The positioning projection 23 of the one-end-side connection unit 6 forms a positioning mechanism (a one-end-side positioning mechanism) that realizes positioning of the one-end-side connection unit 6 with respect to the input-side connection unit 5 together with the positioning groove 19 of the input-side connection unit 5.

The positioning mechanism can be switched to a positioning disabling state in which the positioning mechanism does not perform positioning of the one-end-side connection unit 6 with respect to the input-side connection unit 5. Switching of the positioning mechanism to the positioning disabling state can be realized by various structures such as a structure capable of removing the positioning projection 23 of the one-end-side connection unit 6 by moving in an axial direction or an immersion structure in which the positioning projection 23 of the one-end-side connection unit 6 enters into the distal end surface of the connector body 20. The configuration of the one-end-side positioning mechanism that positions the one-end-side connection unit 6 with respect to the input-side connection unit 5 is applied to the configuration of the other-end-side positioning mechanism that positions the other-end-side connection unit 7 with respect to the output-side connection unit 8. Specifically, the other-end-side connection unit 7 has a plurality of other-side blocks (the quartz blocks 14a, 14b, and 14c) that protrude at equal intervals in the circumferential direction to form the transmission paths L1, L2, and L3, and the output-side connection unit 8 has a plurality of output-side insertion holes (not illustrated) which are disposed at equal intervals in the circumferential direction and into which the plurality of other-side blocks are inserted. The output-side connection unit 8 and the other-end-side connection unit 7 have other-end-side positioning mechanisms that position the other-end-side connection unit 7 with respect to the output-side connection unit 8. The other-end-side positioning mechanism can switch to a positioning disabling state in which the mechanism does not perform positioning of the other-end-side connection unit 7 with respect to the output-side connection unit 8. The plurality of other-side blocks (the quartz blocks 14a, 14b, and 14c) are detachable individually, and the plurality of optical fibers 12a, 12b, and 12c are detachable individually.

Next, the flow of switching of the optical fibers 12a to 12c when disconnection or damage of the optical fibers 12a to 12c is detected will be described with reference to FIGS. 1 to 3.

Generally, the optical fiber cable unit 1 transmits a laser beam using one or two of the three optical fibers 12a to 12c (that is, one or two of the three transmission paths L1 to L3). When the electrification means that forms a closed circuit together with the disconnection detection wire detects disconnection or damage of the optical fibers 12a to 12c automatically, the switching mechanism 9 of the input-side connection unit 5 switches a disconnected or damaged optical fiber of the optical fibers 12a to 12c (the transmission paths L1 to L3) to another optical fiber automatically. The disconnection or damage of the optical fibers 12a to 12c may be detected manually and the optical fibers 12a to 12c may be switched manually.

As described above, according to the present embodiment, since the plurality of optical fibers 12a to 12c are incorporated in one optical fiber cable 3, it is possible to connect the plurality of optical fibers 12a to 12c at once by one connection of the one-end-side connection unit 6 to the input-side connection unit 5 and one connection of the other-end-side connection unit 7 to the output-side connection unit 8. It is possible to arrange a plurality of optical fibers with a smaller number of steps, in a smaller area, and in a smaller region as compared to a case of connecting a plurality of optical fiber cables each having one optical fiber incorporated therein.

Since the optical fibers 12a to 12c can be switched from a disconnected or damaged optical fiber to another optical fiber, even when some of the plurality of optical fibers 12a to 12c are broken, it is possible to continuously use the optical fibers without replacing the entire optical fiber cable 3.

Since the optical fiber cable 3 has the cooling means (not illustrated) incorporated in the metallic flexible tube 13, it is possible to reduce the absorption of light generated by the one-end-side connection unit 6 and the other-end-side connection unit 7, and the amount of heat generated by reflected or scattering light. As a result, it is possible to prevent deterioration of the one-end-side connection unit 6 and the other-end-side connection unit 7.

The positioning mechanism formed by the positioning groove 19 of the input-side connection unit 5 and the positioning projection 23 of the one-end-side connection unit 6 can switch to a positioning disabling state in which the mechanism does not perform positioning of the one-end-side connection unit 6 with respect to the input-side connection unit 5. Due to this, by switching the positioning mechanism to the positioning disabling state, when the one-end-side connection unit 6 is connected to the input-side connection unit 5, it is possible to switch the optical fibers 12a to 12c to be used by turning and attaching the one-end-side connection unit 6.

[Second Embodiment]

Figure 4:
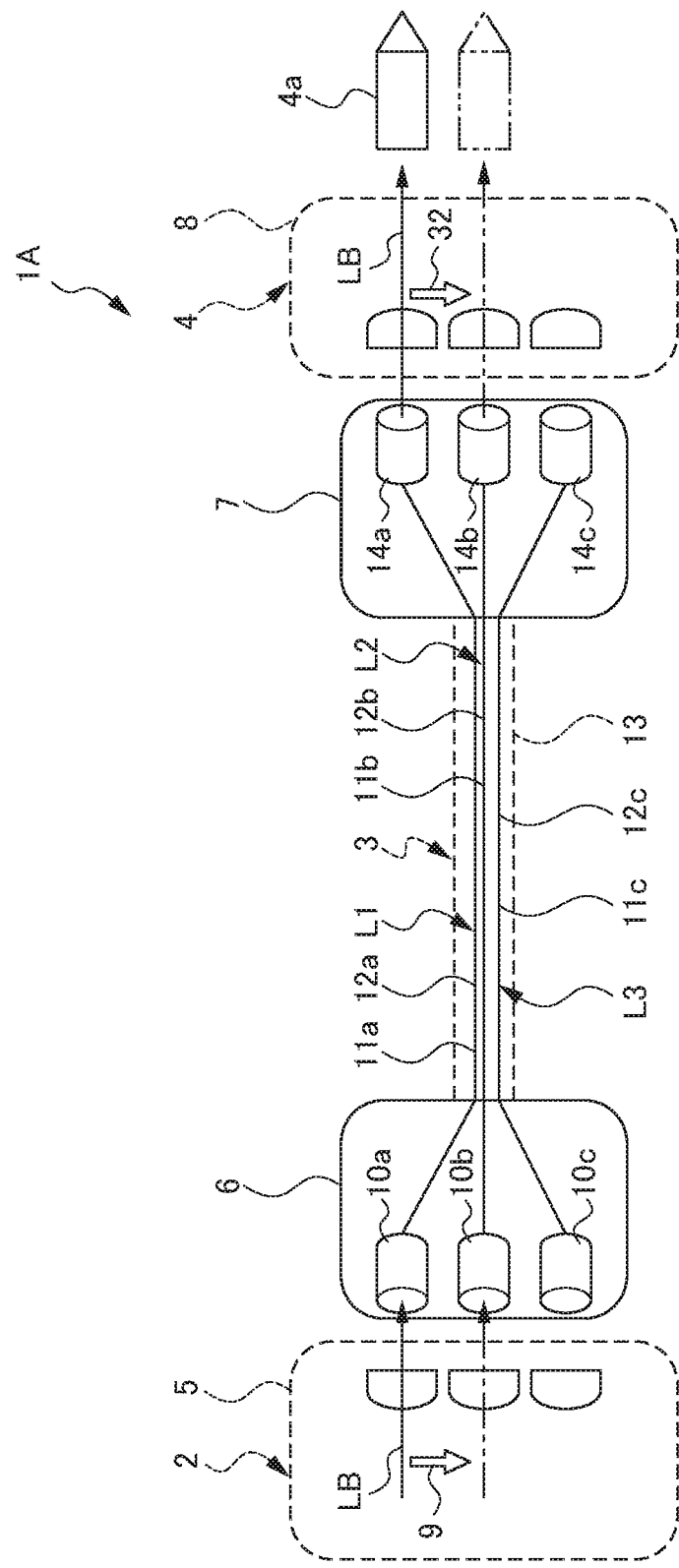
FIG. 4 is a schematic diagram of an optical fiber cable unit according to a second embodiment of the present invention.

FIG. 4 is a schematic diagram of an optical fiber cable unit 1A according to a second embodiment of the present invention. The optical fiber cable unit 1A according to the present embodiment is different from the first embodiment in that the output-side connection unit 8 does not include the merging mechanism 15.

As illustrated in FIG. 4, in the optical fiber cable unit 1A of the second embodiment, the output-side connection unit 8 has a switching mechanism 32. The switching mechanism 32 can be realized by various structures such as a structure that guides the laser beam LB from the outlets of the transmission paths L1 to L3 to a machining head 4a of the output device 4 by moving a mirror or a structure that guides the laser beam LB from the outlets of the transmission paths L1 to L3 to the machining head 4a of the output device 4 by moving the outlets of the transmission paths L1 to L3.

Next, the flow of switching of the optical fibers 12a to 12c when disconnection or damage of the optical fibers 12a to 12c is detected will be described with reference to FIG. 4.

The optical fiber cable unit 1A switches a disconnected or damaged optical fiber of the optical fibers 12a to 12c (the transmission paths L1 to L3) to another optical fiber automatically with the aid of the switching mechanism 9 of the input-side connection unit 5. The optical fiber cable unit 1A switches the optical fibers 12a to 12c (the transmission paths L1 to L3) for transmitting the laser beam LB to the machining head 4a of the output device 4 with the aid of the switching mechanism 32 of the output-side connection unit 8. The optical fibers 12a to 12c may be switched manually.

[Third Embodiment]

Figure 5:
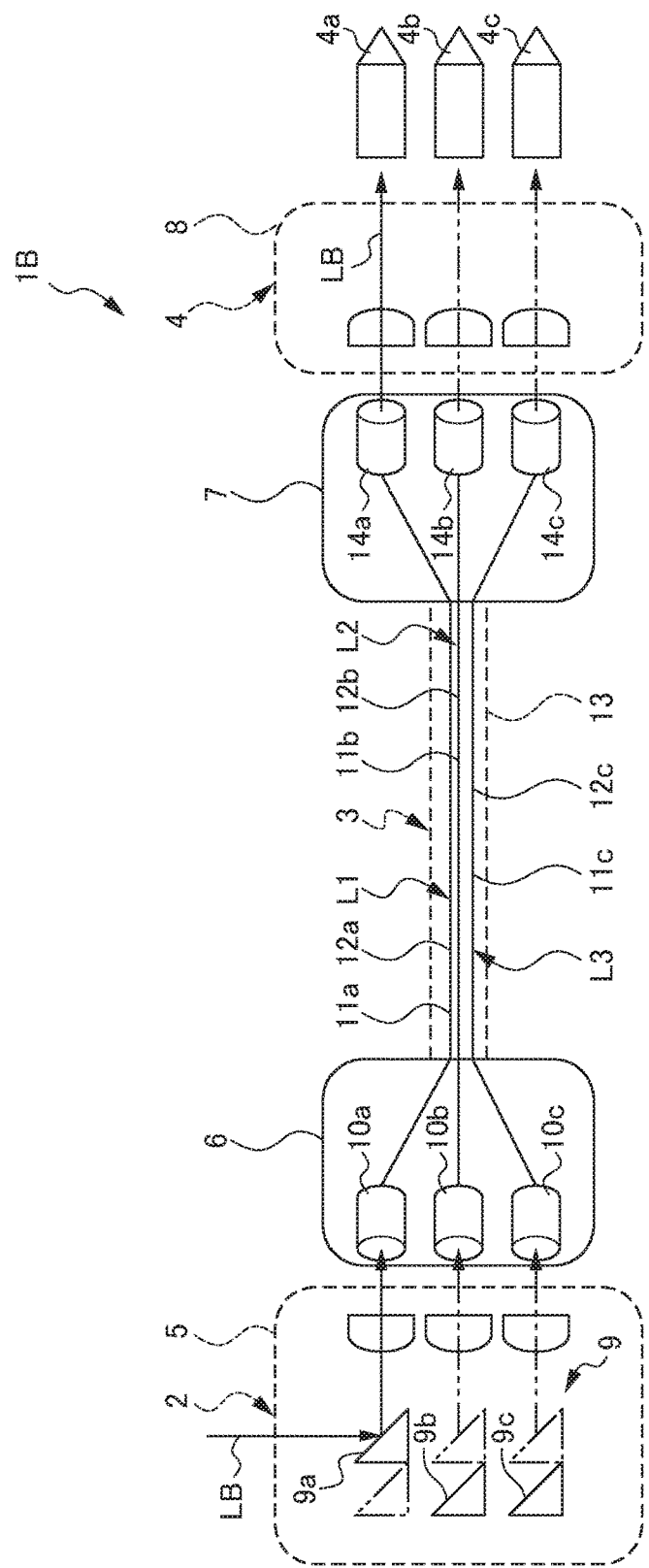
FIG. 5 is a schematic diagram of an optical fiber cable unit according to a third embodiment of the present invention.

FIG. 5 is a schematic diagram of the optical fiber cable unit 1B according to a third embodiment of the present invention. The optical fiber cable unit 1B according to the present embodiment is different from the first embodiment in that the output-side connection unit 8 does not include the merging mechanism 15.

As illustrated in FIG. 5, in the optical fiber cable unit 1B of the third embodiment, the input-side connection unit 5 has the switching mechanism 9. The switching mechanism 9 has a plurality of mirrors 9a, 9b, and 9c. The switching mechanism 9 has a structure that guides the laser beam LB generated by the input device 2 to the inlets of the transmission paths L1 to L3 for transmitting the laser beam LB by moving the mirrors 9a to 9c.

The core of at least one of the plurality of optical fibers 12a to 12c has a different diameter from that of the cores of the other optical fibers 12a to 12c. For example, the core of the optical fiber 12a has a diameter of 50 μm, the core of the optical fiber 12b has a diameter of 80 μm, and the core of the optical fiber 12c has a diameter of 150 μm. The outlets of the transmission paths L1 to L3 guide the laser beam LB to the respective machining heads 4a, 4b, and 4c of the output device 4.

Next, the flow of switching of the optical fibers 12a to 12c will be described with reference to FIG. 5. The optical fiber cable unit 1B switches the optical fibers 12a to 12c (the transmission paths L1 to L3) for transmitting the laser beam LB with the aid of the switching mechanism 9 of the input-side connection unit 5 under the control of a machining program for machining the thickness of a plate to be cut, for example. The type of the machining heads 4a to 4c or the type of nozzles may be selected under the control of the machining program. The optical fibers 12a to 12c may be switched manually.

As described above, according to the present embodiment, three machining heads 4a to 4ca can be used by being switched to one machining head. Since the cores of the three optical fibers 12a to 12c have different diameters, by switching the optical fibers 12a to 12c to be used, it is possible to change the characteristics of the laser beam that passes through the optical fibers 12a to 12c. When the diameters of the cores of the optical fibers 12a to 12c are decreased to create a near single-mode optical fiber, since a light condensing performance is improved, it is possible to improve the cutting speed when cutting a thin plate, for example. On the other hand, when the diameters of the cores of the optical fibers 12a to 12c are increased to create a near multimode optical fiber, it is possible to improve the performance of cutting a middle thickness plate.

[Fourth Embodiment]

Figure 6:
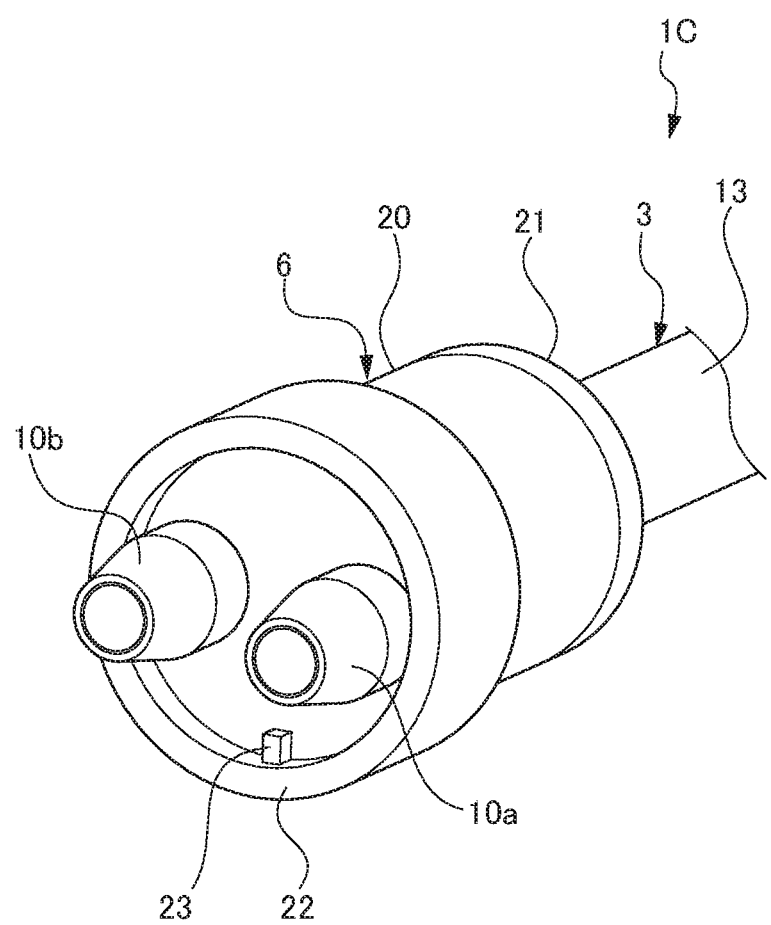
FIG. 6 is an external perspective view of a one-end-side connection unit that forms an optical fiber cable unit according to a fourth embodiment of the present invention.

FIG. 6 is an external perspective view of a one-end-side connection unit 6 that forms an optical fiber cable unit 1C according to a fourth embodiment of the present invention. The optical fiber cable unit 1C according to the present embodiment is different from the first embodiment in that two transmission paths are provided.

As illustrated in FIG. 6, the one-end-side connection unit 6 that forms the optical fiber cable unit 1C of the fourth embodiment has tapered quartz blocks 10a and 10b that protrude from the distal end surface of the connector body 20 at an equal interval (an equal angular interval) of 180° in the circumferential direction. The other configuration of the optical fiber cable unit 1C is obtained by changing the configuration of the first embodiment so that the number of transmission paths is changed to two, and the description thereof will be omitted. The configuration of the second and third embodiments may be changed so that the number of transmission paths is changed to two similarly to the fourth embodiment.

[Fifth Embodiment]

Figure 7:
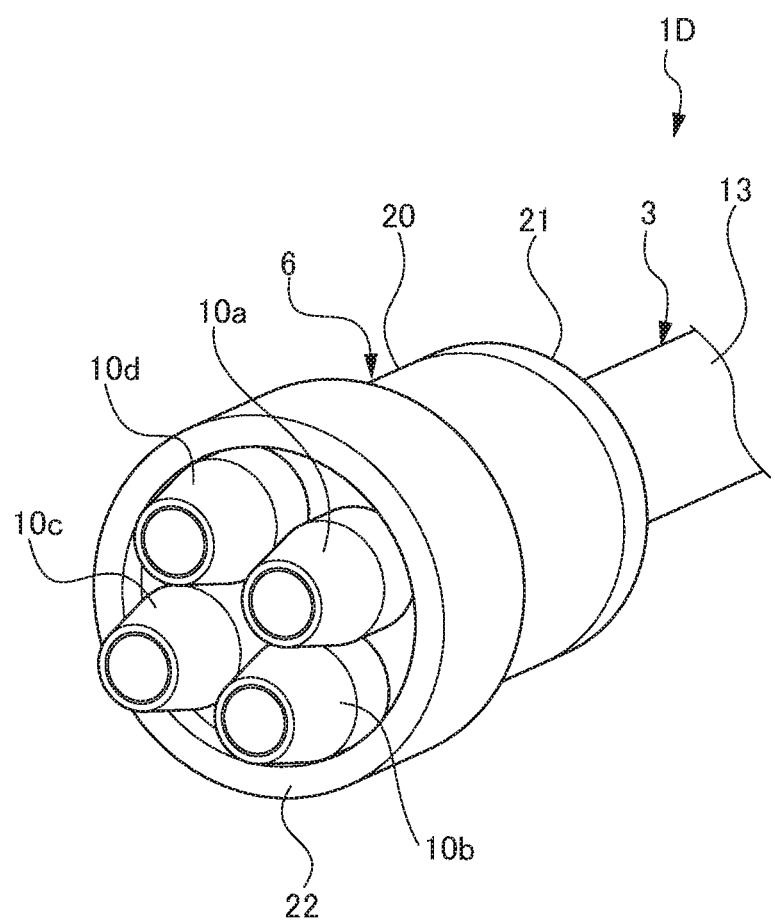
FIG. 7 is an external perspective view of a one-end-side connection unit that forms an optical fiber cable unit according to a fifth embodiment of the present invention.

FIG. 7 is an external perspective view of the one-end-side connection unit 6 that forms an optical fiber cable unit 1D according to a fifth embodiment of the present invention. The optical fiber cable unit 1D according to the present embodiment is different from the first embodiment in that four transmission paths are provided.

As illustrated in FIG. 7, the one-end-side connection unit 6 that forms the optical fiber cable unit 1D of the fifth embodiment has tapered quartz blocks 10a, 10b, 10c, and 10d that protrude from the distal end surface of the connector body 20 at equal intervals (equal angular intervals) of 90° in the circumferential direction. The other configuration of the optical fiber cable unit 1D is obtained by changing the configuration of the first embodiment so that the number of transmission paths is changed to four, and the description thereof will be omitted. The configuration of the second and third embodiments may be changed so that the number of transmission paths is changed to four similarly to the fifth embodiment.

[Sixth Embodiment]

Figure 8:
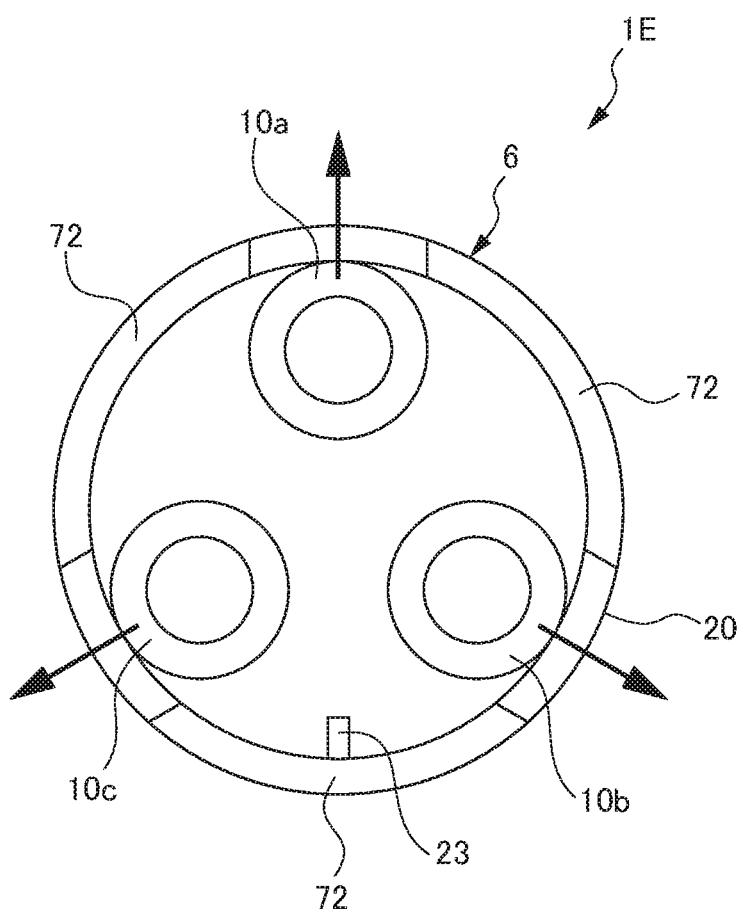
FIG. 8 is a front view of a one-end-side connection unit that forms an optical fiber cable unit according to a sixth embodiment of the present invention.

FIG. 8 is a front view of the one-end-side connection unit 6 that forms an optical fiber cable unit 1E according to a sixth embodiment of the present invention. The optical fiber cable unit 1E according to the present embodiment is different from the first embodiment in that the plurality of quartz blocks 10a to 10c and 14a to 14c are detachable individually and the plurality of optical fiber tubes 11a to 11c (the plurality of optical fibers 12a to 12c) are detachable individually.

As illustrated in FIG. 8, the one-end-side connection unit 6 that forms the optical fiber cable unit 1E has a guide frame 72 which is formed in an entire rim of the distal end surface of the connector body 20 and into which the distal end of the connector body of the input-side connection unit is fitted. The guide frame 72 has such a shape that portions adjacent to the quartz blocks 10a to 10c are notched to form a discontinuous annular shape. The one-end-side connection unit 6 is configured so that the plurality of quartz blocks 10a to 10c formed on the distal end surface of the connector body 20 are detachable in the radial direction individually. The optical fiber cable unit 1E is configured such that the plurality of optical fiber tubes 11a to 11c (the plurality of optical fibers 12a to 12c) are detachable thereto individually via positions from which the plurality of quartz blocks 10a to 10c are removed individually. Although not illustrated in the drawing, the plurality of quartz blocks formed on the distal end surface of the other-end-side connection unit that forms the optical fiber cable unit 1E may be configured to be detachable in a radial direction individually similarly to the plurality of quartz blocks 10a to 10c.

As described above, according to the present embodiment, only a broken optical fiber from 12a to 12c among the plurality of optical fibers 12a to 12c can be replaced.

While embodiments of the present invention have been described, the present invention is not limited to the above-described embodiments. The advantageous effects described in the present embodiments are only examples of most preferable effects produced by the present invention, and the advantageous effects of the present invention are not limited to those described in the present embodiments.

In the above-described embodiments, although the input-side connection unit 5 has the switching mechanism 9 or the output-side connection unit 8 has the switching mechanism 32, the present invention is not limited thereto. At least one of the input-side connection unit 5, the one-end-side connection unit 6, the other-end-side connection unit 7, and the output-side connection unit 8 may have a switching mechanism that switches the transmission paths L1 to L3 for transmitting the laser beam.

In the above-described embodiments, although the input-side connection unit 5 has one positioning groove 19 formed in the rim of the distal end surface of the connector body 16 to realize positioning of the one-end-side connection unit 6, the present invention is not limited thereto. A number of positioning grooves 19 same as the number of the plurality of transmission paths may be disposed at equal intervals in the circumferential direction.

EXPLANATION OF REFERENCE NUMERALS 1, 1A, 1B, 1C, 1D: Optical fiber cable unit
3: Optical fiber cable
5: Input-side connection unit
6: One-end-side connection unit
7: Other-end-side connection unit
8: Output-side connection unit
9, 32: Switching mechanism
10a, 10b, 10c, 10d: Quartz block (One-end-side block)
12a, 12b, 12c: Optical fiber
14a, 14b, 14c: Quartz block (Other-side block)
15: Merging mechanism
18a, 18b, 18c: Input-side insertion hole
19: Positioning groove (One-end-side positioning mechanism)
23: Positioning projection (One-end-side positioning mechanism)
L1, L2, L3: Transmission path
LB: Laser beam

What is claimed is:

1. An optical fiber cable unit which has an optical fiber cable obtained by binding a plurality of optical fibers and which transmits a laser beam using a plurality of transmission paths having the optical fibers, respectively, the optical fiber cable unit comprising:
   an input-side connection unit which is a connection unit on a side where the laser beam is input to the optical fiber;
   a one-end-side connection unit which is fixed to one end of the optical fiber cable and is connected to the input-side connection unit;
   an other-end-side connection unit fixed to the other end of the optical fiber cable;
   an output-side connection unit to which the other-end-side connection unit is connected and which is a connection unit on a side where the laser beam from the optical fiber is output; and
   a guide frame positioned on an entire rim of a distal end of the one-end-side connection unit,
   wherein
      at least one of the input-side connection unit, the one-end-side connection unit, the other-end-side connection unit, and the output-side connection unit has a switching mechanism that switches the transmission path for transmitting the laser beam,
      the one-end-side connection unit has a plurality of one-end-side blocks that protrude at equal intervals in a circumferential direction to form the transmission path,
      the input-side connection unit and the one-end-side connection unit have a one-end-side positioning mechanism that realizes positioning of the one-end-side connection unit with respect to the input-side connection unit, and
      the guide frame surrounds at least a portion of each of the one-end-side blocks.

2. The optical fiber cable unit according to claim 1, wherein
   the output-side connection unit has a merging mechanism that merges the plurality of transmission paths.

3. The optical fiber cable unit according to claim 1, wherein
   a core of at least one of the plurality of optical fibers has a different diameter than that of a core of the other optical fiber.

4. The optical fiber cable unit according to claim 1, wherein
   the input-side connection unit has a plurality of input-side insertion holes which are disposed at equal intervals in a circumferential direction and in which the plurality of one-end-side blocks are inserted,
   and the one-end-side positioning mechanism is switchable to a positioning disabling state in which the mechanism does not perform positioning of the one-end-side connection unit with respect to the input-side connection unit.

5. The optical fiber cable unit according to claim 1, wherein the plurality of one-end-side blocks are detachable individually, and the plurality of optical fibers are detachable individually.

6. An optical fiber cable unit which has an optical fiber cable obtained by binding a plurality of optical fibers and which transmits a laser beam using a plurality of transmission paths having the optical fibers, respectively, the optical fiber cable unit comprising:

an input-side connection unit which is a connection unit on a side where the laser beam is input to the optical fiber;

a one-end-side connection unit which is fixed to one end of the optical fiber cable and is connected to the input-side connection unit;

an other-end-side connection unit fixed to the other end of the optical fiber cable;

an output-side connection unit to which the other-end-side connection unit is connected and which is a connection unit on a side where the laser beam from the optical fiber is output; and a guide frame positioned on an entire rim of a distal end of the other-end-side connection unit, wherein at least one of the input-side connection unit, the one-end-side connection unit, the other-end-side connection unit, and the output-side connection unit has a switching mechanism that switches the transmission path for transmitting the laser beam, the other-end-side connection unit has a plurality of other-side blocks that protrude at equal intervals in a circumferential direction to form the transmission path, the output-side connection unit and the other-end-side connection unit have an other-end-side positioning mechanism that realizes positioning of the other-end-side connection unit with respect to the output-side connection unit, and the guide frame surrounds at least a portion of each of the other-end-side blocks.

7. The optical fiber cable unit according to claim 6, wherein the output-side connection unit has a plurality of output-side insertion holes which are disposed at equal intervals in a circumferential direction and into which the plurality of other-side blocks are inserted, and the other-end-side positioning mechanism is switchable to a positioning disabling state in which the mechanism does not perform positioning of the other-end-side connection unit with respect to the output-side connection unit.

8. The optical fiber cable unit according to claim 6, wherein the plurality of other-side blocks are detachable individually, and the plurality of optical fibers are detachable individually.

9. The optical fiber cable unit according to claim 6, wherein the output-side connection unit has a merging mechanism that merges the plurality of transmission paths.

10. The optical fiber cable unit according to claim 6, wherein a core of at least one of the plurality of optical fibers has a different diameter than that of a core of the other optical fiber.

* * * * *